May 3, 1949.                    L. F. THIRY                    2,468,900
                                ENGINE MOUNT
                            Filed Dec. 11, 1944
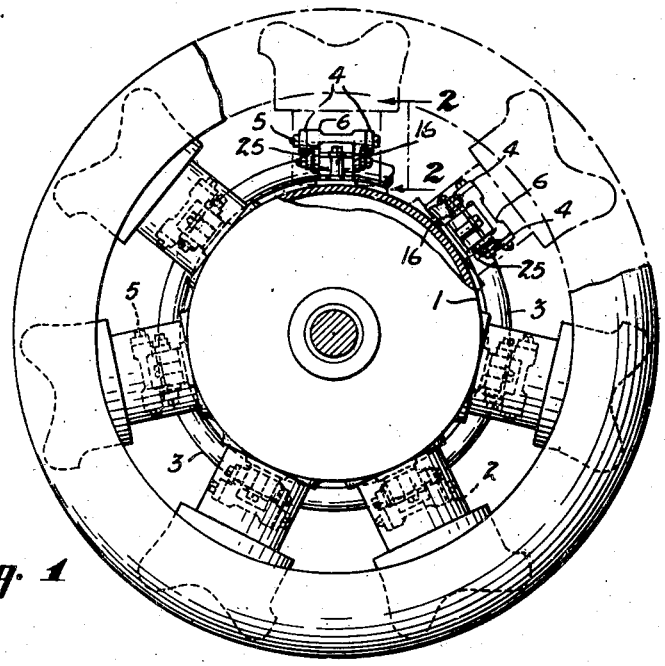
Fig. 1
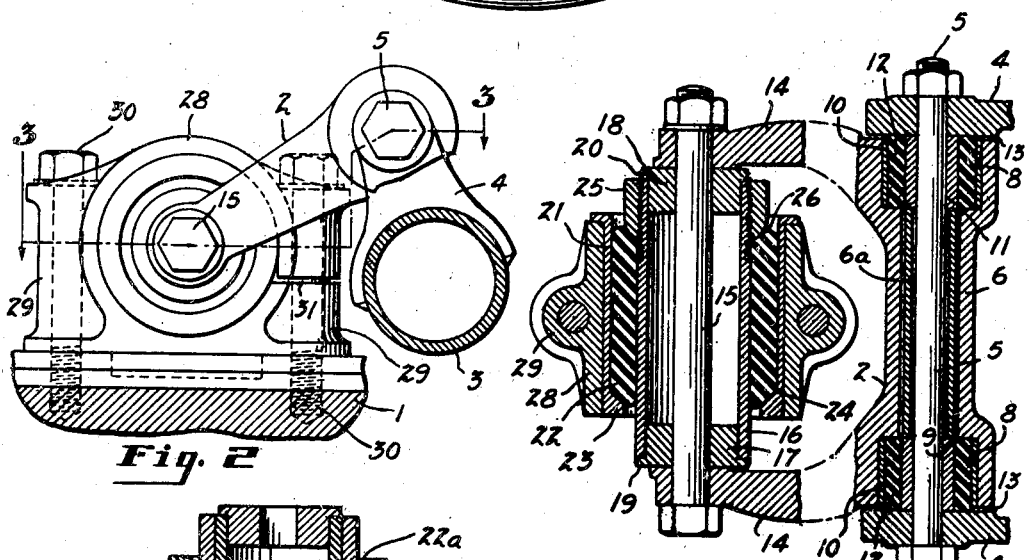
Fig. 2
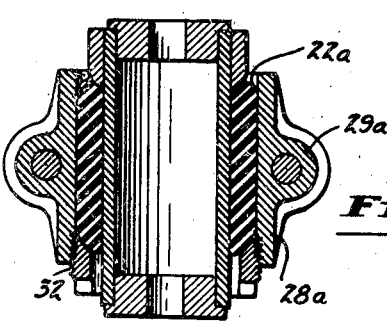
Fig. 4
Fig. 3
INVENTOR.
Leon F. Thiry
BY Evans & McCoy
ATTORNEYS Patented May 3, 1949

2,468,900

UNITED STATES PATENT OFFICE 2,468,900

ENGINE MOUNT

Leon F. Thiry, Montclair, N. J., assignor to The General Tire & Rubber Company, Akron, Ohio, a corporation of Ohio Application December 11, 1944, Serial No. 567,609

9 Claims. (Cl. 248—5)

This invention relates to flexible engine mounts and more particularly to mounts for radial engines of the aircraft type in which the engine is supported by an annular group of elastic rubber cushions surrounding the engine axis.

The present invention has for an object to provide an improved mount of the character referred to, in which the oscillatory vibrations of the engine are effectively limited in amplitude and in which resonance of the cushioning elements with the torsional vibrations of the engine is avoided by providing cushioning elements with energy absorbing characteristics that increase with deflection at different ratios.

A further object of the invention is to provide vibration dampeners or snubbers associated with the individual cushioning elements which increase the energy absorption characteristics of their cushioning elements in one direction only.

A further object of the invention is to provide means in connection with certain of the cushioning elements, for exerting a snubbing action in one direction and with other of the cushioning elements for exerting a snubbing action in the opposite direction, so as to effectively limit angular movements of the engine about its axis in either direction without objectionably stiffening the supporting annulus.

A further object of the invention is to provide a series of detachable, interchangeable and reversible cushioning elements dispersed about the engine axis and so arranged that the deflection characteristics of the elements in various parts of the supporting annulus are such as to advantageously distribute the load upon the cushioning elements.

A further object of the invention is to provide reversible cushioning elements of the rubber bushing type in which the cushion is resistant to axial movement in either direction, but more resistant to movement in one direction than in the other, so that the resistance to torsional thrusts exerted by the engine in one direction may be properly proportioned to the resistance to thrusts in the opposite direction by positioning certain of the cushioning elements reversely with respect to others.

It is also an object of the invention to reduce the wear on the pivots connecting the suspension links to the support and to the engine, by providing elastically supported bearings for the pivots at both ends of the links.

With the above and other objects in view, the invention may be said to comprise the engine mount as illustrated in the accompanying drawings, hereinafter described and particularly set forth in appended claims, together with such variations and modifications thereof as will be apparent to one skilled in the art to which the invention pertains.

Reference should be had to the accompanying drawings forming a part of this specification, in which:

Fig. 1 is a front elevation of an engine mount embodying the invention;

Fig. 2 is a section taken on the line indicated at 2—2 in Fig. 1;

Fig. 3 is a section taken on the line indicated at 3—3 in Fig. 2, and

Fig. 4 is an axial section through a cushioning element of slightly modified construction.

In the accompanying drawings, an embodiment of the invention is shown in which an engine 1, which may be a radial aircraft engine, is supported by an annular group of slanting, converging links 2 that surround the axis of the engine, with their inner ends pivoted to the engine 1 and their outer ends pivoted to a supporting ring 3 that is positioned substantially perpendicular to the engine axis and substantially coaxial with the engine. The ring 3 carries circumferentially spaced pivot brackets 4, which are arranged in pairs throughout the periphery of the ring to provide supports for pivot shafts 5 which as herein shown are in the form of bolts fastened in fixed positions, one to each pair of brackets. The pivot shafts 5 are disposed substantially in a plane perpendicular to the engine axis and at substantially equal distances from the engine axis.

The links 2 are wide links, each provided with a transverse bore 6 at its outer end to receive a pivot shaft 5. At the opposite ends of the bore 6, there is a counterbore 8 which terminates in a flat shoulder 9 disposed in a plane at right angles to the axis of the bore 6. The counterbores 8 provide recesses for cushioned bearing rings, each of which comprises an outer metal ring 10 that fits within the periphery of the counterbore 8 and against the shoulder 9 of the counterbore, an inner bearing ring 11 that fits upon the pivot shaft 5 and a rubber bushing 12 that is interposed between the rings 10 and 11. The rubber bushing 12 is composed of elastic natural or synthetic rubber and is preferably held under radial compression between the rings 10 and 11. The brackets 4 are provided with flat inner faces 13 which overlie the opposite sides of the links 2 and the outer ends of the rings 10, 11 and 12. The faces 13 engage the rings 11 and there is a slight clearance between the side faces 13 and the rings 10 and the side faces of the link. A sleeve 6a in the bore 6 is interposed between the rings 11 and serves to space the brackets 4 when the pivot bolts are tightened. The resilient bushings 12 interposed between the rings 10 and 11 are yieldable radially and axially to permit the links 2 to have slight radial and axial movements with respect to the brackets 4.

Each of the supporting links 2 is forked to provide parallel laterally spaced arms 14 which carry pivot shafts 15, which as herein shown are in the form of bolts, fastened one to the spaced arms of each link. The pivot shafts 15 are parallel to the pivot shafts 5, and are disposed substantially in a plane normal to the engine axis and offset with respect to the plane of the pivot shafts 5 so that the links 2 converge toward the engine axis and are slanted with respect thereto. The spaced arms 14 of each link, straddle a sleeve 16 that is provided with heads 17 and 18, which bear against the inner faces of the arms 14 and which fit upon the pivot shaft 15. The heads 17 and 18 are provided with flanges 19 and 20 that overlie the ends of the tubular sleeve 16 to hold the same against axial movement with respect to the shaft 15. Surrounding the sleeve 16 is an outer cylinder 21, and interposed between the sleeve 16 and cylinder 21 there is a rubber bushing 22 which is preferably held under radial compression between the sleeve and outer cylinder. The outer cylinder 21 has an internal shoulder 23 at one end thereof and this shoulder is provided with an internally beveled cam face 24 that engages with one end of the rubber bushing 22. On the sleeve 16 there is mounted a shoulder ring 25 that is provided with an externally beveled cam face 26 that engages the end of the bushing 22, opposite that engaged by the cam face 24. Each of the bushing engaging shoulders has the effect of impeding the deflection of the bushing 22 upon axial movement of the outer cylinder 21 in one direction with respect to the sleeve 16. The cam faces 24 and 26 impede movement of the cylinder 21 in one direction only and neither of the shoulders interferes with the rebound movement of the cushion. The confining action of each of the bushing engaging shoulders is dependent both upon the radial depth of the shoulder and upon the shape of the cam face of the shoulder. The energy absorbing or impeding action is increased by increase in the radial depth of the shoulders and the rate of increase in energy absorption may be varied by varying the contour of the cam faces 24 and 26. Each shoulder acts as a snubber and vibration dampener for its cushion, and shoulders of the desired size and contour may be assembled with each rubber bushing so that the deflection characteristics of cushioning elements in different portions of the supporting annulus may be varied as desired.

The ring 25 is preferably screwed on the sleeve 16 for axial adjustment to place the bushing 22 under the desired axial compression. It will be apparent that the stiffness of the rubber cushion in the direction in which axial movement is impeded by the shoulders 24 and 26, may be increased by increasing the initial axial compression of the rubber cushion.

Each of the cylinders 21 is mounted within a tubular housing member 28 that is provided with diametrically opposite bosses 29 that receive bolts 30 which rigidly secure the housing members 28 to the engine 1. The housing 28 may be split along one side through one of the bosses 29 as shown at 31 in Fig. 2, so that the cylinder 21 is tightly clamped within the housing 28 by the clamping bolts.

Each sleeve 16, cylinder 21 and bushing 22 forms a cushioning unit that may be mounted upon any one of the pivot shafts 15, and each of these cushioning units is reversible on its pivot shaft so as to reverse the action of the confining shoulders. Any one of the cushioning elements may be readily removed and replaced by another.

The rubber bushings 22 provide regularly spaced, circumferentially disposed cushions around the axis of the engine 1, which are so disposed that torsional vibrations of the engine cause relative axial movements of the outer cylinders 21 with respect to the sleeves 16. The provision of snubbers on the individual cushioning elements tends to limit the amplitude of such torsional vibrations and these snubbers which act as vibration dampeners for the individual cushioning elements, also assist in preventing a condition of resonance with the engine vibrations in the individual cushioning elements. By reversing certain of the cushioning elements with respect to others, as shown in Fig. 1, individual snubbers may be made effective, some to impede angular movements of the engine in one direction and others to impede angular movements of the engine in the opposite direction. Also by providing cushions of different stiffness in different portions of the supporting annulus, the individual cushioning elements will be caused to have different vibration periods, and the weight of the engine may be advantageously distributed upon the cushioning elements.

In Fig. 4 of the drawings there is shown a cushioning element of slightly modified construction in which the rubber bushing 22a is mounted directly within a tubular housing 28a provided with bolt receiving bosses 29a, the housing 28a being provided with an internal shoulder ring 32 for engagement with one end of the bushing 22a, which may be threaded for axial adjustment in the housing 28a.

By proper adjustment of the threaded shoulder rings 25 or 32 the stiffness of the individual cushions may be regulated to properly center the engine with respect to its supports.

The threaded rings 25 or 32 are readily accessible and individual rings may be adjusted while the engine is running to minimize vibratory movements.

It is to be understood that variations and modifications of the specific device herein shown and described for purposes of illustration, may be made without departing from the spirit of the invention.

What I claim is:

1. An engine mount comprising a support, an annular group of supporting links converging toward a point spaced laterally from said support and pivotally connected at their outer ends to said support and at their inner ends to the engine, one pivotal connection of each link comprising a pivot shaft transverse to the link, a sleeve turnable upon said shaft and held against axial movement thereon, a tubular connecting member surrounding the sleeve and an elastic rubber bushing interposed between the sleeve and tubular member and yieldably connecting the sleeve and tubular member, an internal confining shoulder carried by the tubular member and having an internally beveled face engaging one end of said elastic bushing, an external confining shoulder carried by the sleeve and having an externally beveled face engaging the opposite end of the bushing, said shoulders exerting axial pressure on the bushing and increasing resistance to relative axial movements of the sleeve and tubular member in one direction, the confining shoulders in the pivotal connections of certain of the links throughout the annular group being reversely arranged with respect to the confining shoulders of other pivotal connections.

2. An engine mount comprising a support, a circular row of outer pivot shafts mounted in fixed positions on said support, said shafts having their axes at substantially equal distances from a central axis and having their axes substantially in a plane perpendicular to said axis, a link having a transverse opening to receive said shaft and bearing recesses at opposite ends of said opening, a bearing mounted in each of said recesses comprising an outer ring fitting within the periphery of the recess and engaging the inner wall of the recess, an inner ring coaxial with the outer and fitting upon the pivot shaft and an elastic rubber bushing held under radial compression between the two rings, members fixed with respect to the support and engaging the outer sides of the bearing, an inner pivot shaft carried by each link and parallel with the outer pivot shaft of the link, and a pivot member receiving each of said inner shafts and connected to the engine, and means for yieldably resisting relative movements of the connecting members and inner pivot shafts axially of said shafts.

3. An engine mount comprising a support, an annular group of links surrounding the engine axis, said links converging slantingly toward said axis with their inner ends connected to the engine and their outer ends connected to the support, parallel pivots connecting each link to the support and engine, two spaced elastic bushings interposed between the outer end of each link and its outer pivot, and a single centrally disposed elastic bushing interposed between each inner pivot and the engine.

4. An engine mount comprising a support, an annular group of links surrounding the engine axis, said links converging slantingly toward said axis with their inner ends connected to the engine and their outer ends connected to the support, pivot shafts mounted in fixed positions on the support upon which the outer ends of the links are mounted, inner pivot shafts parallel with the outer and mounted in the links, two axially spaced elastic rubber bushings interposed between each link and the outer pivot shaft, and a single elastic rubber bushing centrally disposed with respect to each pair of spaced bushings, each of said centrally disposed bushings being interposed between an inner pivot shaft and said engine.

5. An engine mount comprising a support, an annular group of links surrounding the engine axis, said links converging slantingly toward said axis with their outer ends connected to the support and their inner ends forked and connected to the engine, outer pivot shafts mounted in fixed positions on the support, two axially spaced bearing members carried by each link and rotatable on one of said pivot shafts, each of said bearing members comprising an inner ring on said shaft, outer ring carried by the link and an elastic bushing between said rings, centrally disposed bearing members fixed to the engine with their axes parallel to said outer pivot shafts and received in the forked end of each link, each centrally disposed bearing member comprising an outer tubular housing, a sleeve coaxial with the housing and fitting in the fork of the link and an elastic rubber bushing between the housing and sleeve, and an inner pivot shaft carried by each link and extending axially through the sleeve fitting in the fork of the link.

6. A mount for a radial engine comprising a plurality of annularly disposed cushioning elements arranged for absorbing oscillatory engine motion about the axis of said engine, each of said elements comprising a snubber means, wherein each of said cushioning elements comprises a member for attachment to said engine, another member for attachment to a support and a resilient element secured between said members for resiliently resisting motion therebetween in a direction transverse to the axis of said engine, said snubber means comprising elements secured to said members and arranged to compress said resilient element in one direction of relative motion between said members but not in the opposite direction.

7. A mount for a radial engine comprising a plurality of annularly disposed cushioning elements, each of said elements comprising a sleeve adapted to be secured to an engine and a sleeve adapted to be secured to a support, said sleeves being concentrically arranged, including a rubber bushing compressively secured therebetween, a shoulder at an end of each sleeve, said shoulders being oppositely disposed and having overlapping portions contiguous with respective ends of said bushing; the axes of said sleeves and bushings being fixed in a plane transverse to the axis of said engine, whereby oscillatory movement of said engine in one angular direction about its axis will cause shear stress in said bushing, while movement in the opposite direction will cause said shoulders to compressively stress said bushing, thereby to effect a greater reactive force to torsional vibration of the engine in the latter direction than in the former.

8. A mount for a radial engine as set forth in claim 7 wherein certain of said cushioning elements are disposed to compressively stress their respective bushings in one direction of torsional vibration of the engine while other of said cushioning elements are reversely disposed to stress their respective bushings in shear when said first elements are in compression, whereby said stress effects on said bushings will change from compression to shear and vice versa in the other direction of torsional vibration.

9. A mount for a radial engine comprising the combination of a plurality of annularly disposed cushioning elements arranged for absorbing oscillatory engine motion about the axis of said engine, each of said cushioning elements comprising a shock absorber of the type wherein shock is absorbed more readily in one direction of engine motion than in the other, certain of said absorbers being directionally disposed to resist engine vibration more yieldingly in one direction while others are disposed to resist engine motion more yieldingly in the opposite direction.

LEON F. THIRY.

REFERENCES CITED

The following references are of record in the file of this patent:

UNITED STATES PATENTS

| Number | Name | Date |
|---|---|---|
| 2,144,848 | Miller | Jan. 24, 1939 |
| 2,241,408 | Lord | May 13, 1941 |
| 2,406,256 | Roche | Aug. 20, 1946 |

FOREIGN PATENTS

| Number | Country | Date |
|---|---|---|
| 382,017 | Great Britain | Oct. 20, 1932 |
| 434,583 | Great Britain | Sept. 4, 1935 |
| 523,195 | Great Britain | July 8, 1940 |